(12) United States Patent
Kotecha et al.

(10) Patent No.: US 10,108,910 B2
(45) Date of Patent: Oct. 23, 2018

(54) MOBILE PARKING SYSTEMS AND METHODS FOR PROVIDING REAL-TIME PARKING GUIDANCE

(71) Applicant: VERIZON PATENT AND LICENSING INC, Basking Ridge, NJ (US)

(72) Inventors: Lalit R. Kotecha, San Ramon, CA (US); Arda Aksu, Martinez, CA (US); Thomas W. Haynes, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 451 days.

(21) Appl. No.: 14/017,248

(22) Filed: Sep. 3, 2013

(65) Prior Publication Data

US 2015/0066545 A1   Mar. 5, 2015

(51) Int. Cl.
*G06Q 10/00* (2012.01)
*G06Q 10/02* (2012.01)
*G08G 1/14* (2006.01)

(52) U.S. Cl.
CPC ............ *G06Q 10/02* (2013.01); *G08G 1/144* (2013.01); *G08G 1/146* (2013.01); *G08G 1/148* (2013.01)

(58) Field of Classification Search
CPC .......... G08G 1/14; G08G 1/147; G06Q 10/02; G07B 15/02
USPC ......................................... 705/13; 340/932.2
See application file for complete search history.

(56) References Cited

U.S. PATENT DOCUMENTS

| | | | |
|---|---|---|---|
| 6,411,895 B1 * | 6/2002 | Lau ................... | G01C 21/3605 340/932.2 |
| 7,516,010 B1 * | 4/2009 | Kaplan ................. | G01C 21/30 340/932.2 |
| 7,538,690 B1 * | 5/2009 | Kaplan ................. | G01C 21/20 340/932.2 |
| 2002/0029164 A1 * | 3/2002 | Sugar .................... | G06Q 10/02 705/13 |

(Continued)

OTHER PUBLICATIONS

"New Smart Parking System Based on Resource Allocation and Reservations" published by IEEE Transactions on Intelligent Transportation Systems in Sep. 2013, p. 1130 (Year: 2013).*

(Continued)

*Primary Examiner* — Brian M Epstein

(57) ABSTRACT

Parking guidance is provided to a user of a mobile device requesting information on parking spots at a requested location for a requested time. In response to receiving a parking information request, parking spots having locations proximate to the requested location and having availability at the requested time are identified in a database of parking spot information of a parking management server. A notification of the identified parking spots is transmitted to the user device from which the information request was received. In response to receiving a reservation request identifying a parking spot to be reserved from the user device, the database is updated to identify the identified parking spot as being unavailable at the requested time. Additionally, a notification of the reservation request is transmitted to a parking manager associated with the identified parking spot, the notification identifying the particular parking spot and the requested time.

20 Claims, 6 Drawing Sheets

(56) References Cited

U.S. PATENT DOCUMENTS

| | | | |
|---|---|---|---|
| 2002/0099574 A1* | 7/2002 | Cahill | G06Q 10/02 705/5 |
| 2004/0068433 A1* | 4/2004 | Chatterjee | G06Q 20/127 705/13 |
| 2004/0254840 A1* | 12/2004 | Slemmer | G06Q 10/02 705/22 |
| 2005/0033634 A1* | 2/2005 | Pugliese, III | G06Q 10/02 705/13 |
| 2005/0280555 A1* | 12/2005 | Warner, IV | G08G 1/14 340/932.2 |
| 2006/0116892 A1* | 6/2006 | Grimes | G06Q 10/02 705/5 |
| 2006/0250278 A1* | 11/2006 | Tillotson | G08G 1/14 340/932.2 |
| 2007/0040701 A1* | 2/2007 | Browne | G08G 1/14 340/932.2 |
| 2008/0263147 A1* | 10/2008 | Ponert | G06Q 10/02 709/203 |
| 2010/0007525 A1* | 1/2010 | Shanbhag | G08G 1/14 340/932.2 |
| 2010/0030708 A1* | 2/2010 | Ward, II | G06Q 20/127 705/418 |
| 2010/0117820 A1* | 5/2010 | Mitschele | G07B 15/02 340/539.1 |
| 2010/0191584 A1* | 7/2010 | Fraser | G06Q 30/0207 705/13 |
| 2011/0022427 A1* | 1/2011 | Dayan | G06Q 10/02 705/5 |
| 2011/0068739 A1* | 3/2011 | Smith | B60L 11/1844 320/109 |
| 2011/0224899 A1* | 9/2011 | Mathews | G01C 21/3685 701/533 |
| 2012/0056758 A1* | 3/2012 | Kuhlman | G08G 1/14 340/932.2 |
| 2012/0095791 A1* | 4/2012 | Stefik | G06Q 10/02 705/5 |
| 2012/0095792 A1* | 4/2012 | Stefik | G06Q 10/02 705/5 |
| 2012/0130777 A1* | 5/2012 | Kaufman | G07B 15/02 705/13 |
| 2012/0191600 A1* | 7/2012 | Boot | B60L 11/1848 705/40 |
| 2013/0073350 A1* | 3/2013 | Blustein | G08G 1/14 705/13 |
| 2013/0143536 A1* | 6/2013 | Ratti | H04W 4/003 455/414.1 |
| 2013/0268187 A1* | 10/2013 | Scofield | G01C 21/3605 701/400 |
| 2013/0273882 A1* | 10/2013 | Walsh | H04W 4/26 455/407 |
| 2014/0062727 A1* | 3/2014 | Aivas | G08G 1/146 340/932.2 |
| 2014/0085109 A1* | 3/2014 | Stefik | G06Q 10/02 340/932.2 |
| 2014/0249742 A1* | 9/2014 | Krivacic | G08G 1/14 701/400 |

OTHER PUBLICATIONS

"Why Parkmobile" (3 pages) Retrieved from: <http://us.parkmobile.com/members/why-park-mobile/> on Aug. 2, 2013.

"Parkmobile USA, Inc. Launches Mobile Payment Solutions in Vallejo, CA" (2 pages) Retrieved from: http://us.parkmobile.com/members/parkmobile-usa-inc-launches-mobile-payment-solutions-in-vallejo-ca/#more-973 on Aug. 2, 2013.

"Parkmobile USA, Inc. Launches Mobile Payment Solutions in New Haven, CT" (2 pages) Retrieved from: http://us.parkmobile.com/members/parkmobile-usa-inc-launches-mobile-payment-solutions-in-new-haven-ct/#more-961 on Aug. 2, 2013.

"Parkmobile USA, Inc. Launches Mobile Payment Solutions at Motor Mart Garage in Boston" (2 pages) Retrieved from: http://us.parkmobile.com/members/parkmobile-usa-inc-launches-mobile-payment-solutions-at-motor-mart-garage-in-boston/#more-952 on Aug. 2, 2013.

"Parkmobile USA, Inc. is the recipient of the 2013 Southeastern Software Association Impact Award" (2 pages) Retrieved from: <http://us.parkmobile.com/members/parkmobile-usa-inc-is-the-recipient-of-the-2013-southeastern-software-association-impact-award/> on Aug. 2, 2013.

* cited by examiner

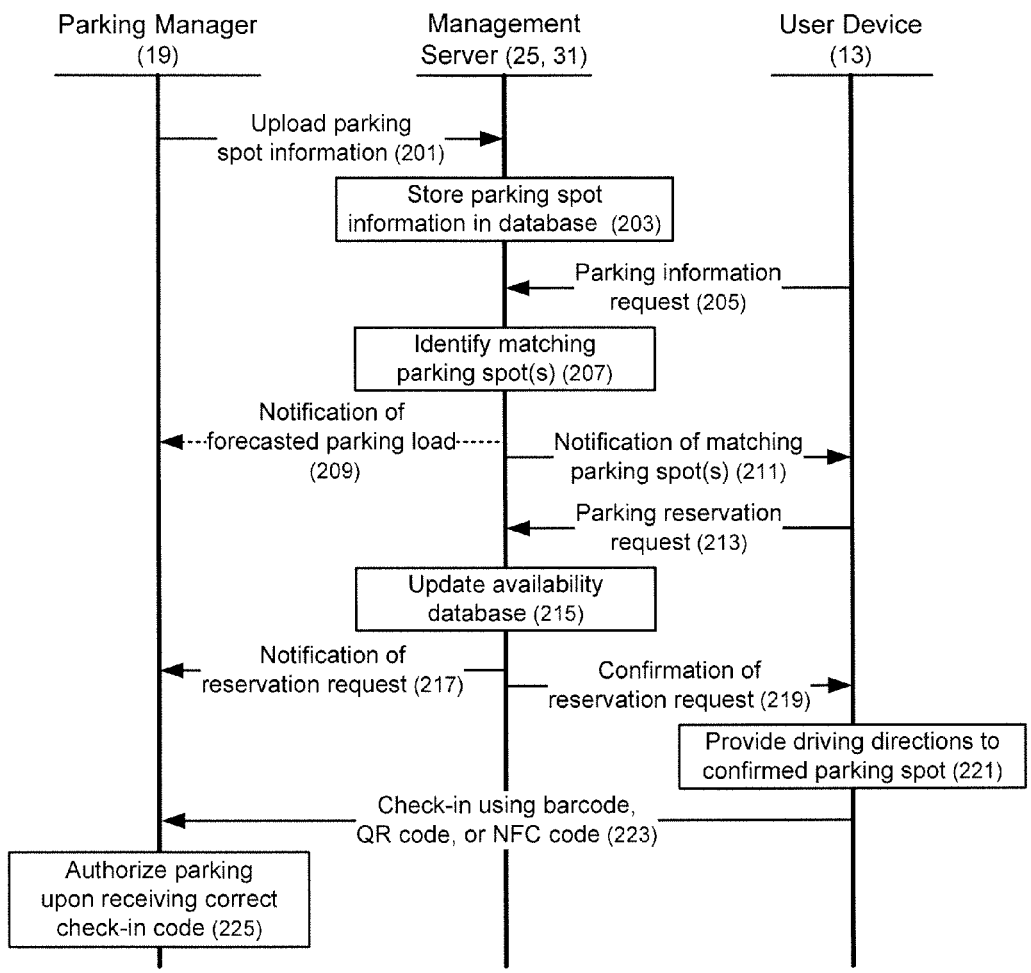

| Parking Spot ID | Location | Parking Manager ID | Availability |
|---|---|---|---|
| x012384 | 3 W Main St | m00001 | ... |
| x123941 | 14 Court St. | m02344 | ... |
| x123942 | 14 Court St. | m02344 | ... |
| x123943 | 14 Court St. | m02344 | ... |
| ... | ... | ... | ... |

MOBILE PARKING SYSTEMS AND METHODS FOR PROVIDING REAL-TIME PARKING GUIDANCE

BACKGROUND

In recent years, vehicle navigation devices providing turn-by-turn directions guiding drivers to their destinations have expanded and increased in popularity. In addition, applications providing navigation services and turn-by-turn directions have been developed for user mobile devices such as cell-phones. As a result, users now commonly use their mobile devices to guide them to their intended destinations.

In addition to turn-by-turn directions, vehicle navigation devices and applications can provide information on landmarks and amenities located within a user's vicinity, such as nearest gas stations, restaurants, hospitals, or the like. The vehicle navigation devices and applications can thus be used to obtain information about and guide users to nearby landmarks and amenities.

The vehicle navigation devices and applications, however, generally do not provide current parking information to users. In particular, the navigation devices and applications do not provide real-time parking information to users, such as information on current and future parking availability at a location. As a result, users cannot rely on navigation devices and applications to locate and select parking garages or parking spots, and must instead drive around in search of open parking spots or parking garages with availability.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a communication flow diagram illustratively showing processing and communications performed as part of providing a real-time parking guidance service.

DETAILED DESCRIPTION

In the following detailed description, numerous specific details are set forth by way of examples in order to provide a thorough understanding of the relevant teachings. In other instances, methods, procedures, components, and/or circuitry have been described at a relatively high-level, without detail, in order to avoid unnecessarily obscuring aspects of the present teachings.

The various methods and systems disclosed herein relate to real-time parking guidance for enabling users having mobile communication devices to efficiently locate, reserve, and check-in to parking spots.

The real-time parking guidance may be provided, in part, by a parking management server storing a database of parking spots. The parking management server receives information on parking spots from parking managers. Each parking manager provides to the server information on the location and availability of parking spots that the manager is responsible for. In turn, a user requests parking information from the parking management server through an application running on a user device such as a smart-phone. In response to the request, the user is provided with information on available parking spots located within the vicinity of a requested location at a requested time. If a user reserves a parking spot, the parking manager is notified by the management server.

Figure 1:
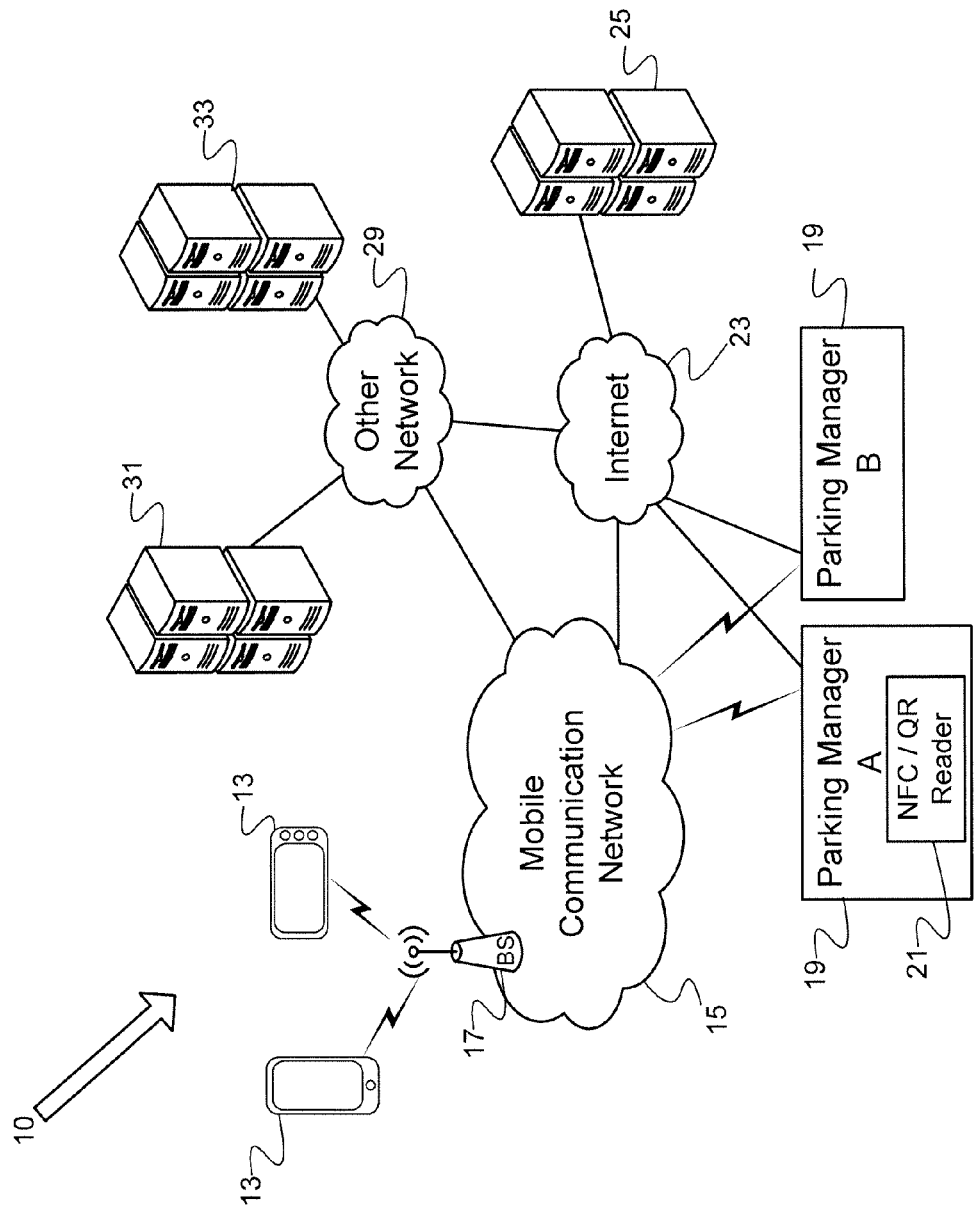
FIG. 1 is a high-level functional block diagram of a system of networks/servers/devices that provide the real-time parking guidance service to users.

Reference now is made in detail to the examples illustrated in the accompanying drawings and discussed below. FIG. 1 illustrates a system 10 for providing real-time parking guidance to users of mobile communication devices. The system 10 includes a mobile communication network 15 providing mobile communication services to a plurality of mobile user devices 13. The network 15 offers a variety of mobile communication services, including data communication services for communication between mobile user devices 13 and servers connected to one or more packet data networks (PDNs) 23, 29. The system 10 additionally includes a plurality of parking managers 19 each responsible for managing one or more parking spots. The parking managers 19 communicate through the mobile communication network 15 and the PDNs 23, 29 with the mobile user devices 13 and a parking management server (e.g., server 25 or 31).

The user devices 13 shown in FIG. 1 are examples of devices that may be used for providing real-time parking guidance services. The example shows simply two mobile user devices 13 as well as a single base station 17 of the mobile communication network 15. However, the network will provide similar communications for many other similar users and devices 13 through additional base stations 17. The devices 13 are capable of data communications through the particular type of network 15. The devices 13 may include smart-phones, tablets, and vehicle navigation devices configured for communication across network 15. More generally, the devices 13 can take the form of portable handsets and personal digital assistants, although they may be implemented in other form factors. The devices 13 may optionally be capable of voice telephone communications and/or messaging communication services through the network 15. The devices 13 may optionally include location capabilities such as global positioning system (GPS)-based location capabilities for receiving and processing signals received from GPS satellites.

The parking managers 19 generally are computers or servers of persons responsible for parking spots. In a first example (e.g., parking manager A of FIG. 1), the parking manager 19 is a server associated with a parking garage or parking lot and that is tasked with managing the parking garage or parking lot. The parking manager 19 may thus store information on parking spots located in the parking garage or parking lot, control access to and egress from the garage or lot (e.g., through control of a door or gate), and process payments from users of the garage or lot. In a second example (e.g., parking manager B of FIG. 1), the parking manager 19 is a computer, tablet, or smart-phone of an individual providing access to one or more parking spots (e.g., a homeowner having parking spot(s) in his driveway). The parking manager 19 of the second example may provide information on the parking spot(s) through a display screen to the individual and/or to users of the parking spot(s). In other examples, the parking manager 19 is a computer or server tasked with managing one or more parking meters or one or more muni-meters associated with on-street or other parking spots, such as a server of a department of motor vehicle (DMV) tasked with managing on-street parking in a city or county. In some examples, the parking manager 19 may provide parking both to users of the parking guidance service and to users driving up to the parking garage, parking lot, parking meter, or muni-meter. In some examples, the parking manager 19 includes an NFC/QR reader 21 for enabling users of the parking guidance service to check-in to a parking spot using a barcode, a quick response (QR) code, or a near-field communication (NFC) code.

A parking management server (e.g., server 25 or 31) stores and maintains a database of information relating to the location and availability of parking spots. The parking management server (25, 31) receives parking spot information from the parking managers 19, and updates the database using the received parking spot information. In the database, each parking spot is identified by a unique identifier, and is associated with location and availability information for the parking spot. Each parking spot further has a parking manager 19 associated therewith. The availability of each parking spot is determined based on information provided by the parking manager 19 to the parking management server (25, 31). For example, the parking spot may initially be available anytime, available during operating hours of a parking garage or lot (e.g., Monday through Friday, between 7 am and 7 pm), or available during specific time periods (e.g., for a period of time extending from two hours prior to the start of a sports team's home game, to two hours following the end of the home game). The availability information may be updated in response to the parking management server (25, 31) receiving a reservation request for a parking spot from a user device 13, and/or in response to the parking management server (25, 31) receiving updated availability information from a parking manager 19 (e.g., in response to a driver entering a parking garage or paying for parking at a muni-meter communicatively coupled to the parking manager 19).

The user devices 13, parking managers 19, and parking management server (e.g., server 25 or 31) are in communication with each other through mobile communication network 15. The present techniques may be implemented in any of a variety of available mobile networks 15 and/or on any of a variety of mobile user devices compatible with such a network 15. The network 15 offers a variety of mobile communication services, including voice and messaging services for communication between two or more mobile user devices 13. The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile communication network 15 can be implemented by a number of interconnected networks.

The network 15 typically offers a variety of data services via the Internet 23, such as downloads, web browsing, email, etc. By way of example, a user device 13 may communicate with a server 25 connected to the Internet 23, and/or with a variety of other types of devices or systems capable of data communications through various interconnected networks. The devices 13 of users of the real-time parking guidance services also can receive and execute applications written in various programming languages, as discussed more later.

An operator or carrier of the network 15 operates a number of systems that provide ancillary functions in support of the communications services and/or application services provided through the network 15, and those elements communicate with other nodes or elements of the network 10 via one or more private IP type packet data networks 29 (sometimes referred to as an Intranet), i.e. a private network. Generally, such systems are part of or connected for communication via the private network 29. Systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

If the mobile service carrier offers the real-time parking guidance service, the service may be hosted on a carrier operated application server 31, for communication via the networks 15 and 29. In such a situation, the parking management server 31 communicates with user devices 13 and parking managers 19 through the private network 29. Alternatively, the real-time parking guidance service may be provided by a separate entity (alone or through agreements with the carrier), in which case, the service may be hosted on an application server such as server 25 connected for communication via the networks 15 and 23. In the alternative situation, the parking management server 25 communicates with user devices 13 and parking managers 19 through the Internet 23.

Additionally, parking managers 19 are generally configured for communication through the Internet 23, and communicate with the parking management server (25, 31) through the Internet 23. In some examples, however, parking managers 19 can be configured for wireless communication through the mobile communication network 15, and may thus communicate with the parking management server (25, 31) through the mobile communication network 15.

To ensure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the application server 31. When the application server (server 31 in our example) receives a service request from a client application on a user device 13, the application server provides appropriate information to the authentication server 33 to allow the server 33 to authenticate the user device 13. Upon successful authentication, the server 33 informs the application server 31, which in turn provides access to the service via data communication through the various communication elements (e.g. 29, 15 and 17) of the network system 10. A similar authentication function may be provided for real-time parking guidance services offered via the server 25, either by the server 33 if there is an appropriate arrangement between the carrier and the operator of server 25, by a program on the server 25 or via a separate authentication server (not shown) connected to the Internet 23.

More detailed information relating to the processing and communications involved in providing the real-time parking guidance service are described below in relation to FIG. 2.

FIG. 2 is a communication flow diagram illustratively showing processing and communications performed as part of a real-time parking guidance method 200.

The method 200 begins with the populating or updating of a parking spot information database of the parking management server (25, 31). Specifically, in step 201, parking managers 19 generate and transmit to the parking management server (25, 31) parking spot information for one or more parking spot(s) associated with the parking managers 19. A parking manager 19 provides parking spot information to the parking manager server (25, 31) upon the parking manager 19 joining the parking guidance system, upon a new parking spot being associated with the parking manager 19, and/or when updated parking information is obtained for a parking spot.

The parking spot information of each parking spot includes location and availability information of the parking spot. The parking management server (25, 31) receives parking spot information from a plurality of parking managers 19, including from parking managers 19 associated with different types of parking spots. For example, the parking management server (25, 31) can receive information on parking spots located in a garage or lot (e.g., multiple spots having a same street address), on parking spots located on-street or at a curb-side (e.g., parking spots each having a different street address), on parking spots located in a homeowner's driveway, or the like. The received parking spot information includes information on the availability of each parking spot. For example, the availability information may indicate that the parking spot is available at all times, is available only during certain time periods (e.g., Monday through Friday, between 7 am and 7 pm) or for particular events (e.g., for a period of time extending from two hours prior to the start of a sports team's home games, to two hours following the end of the home games). The availability information may further indicate that the parking spot is not available at one or more times (e.g., a user has previously scheduled a parking session in the parking spot for July 14th between 2 pm and 4 pm).

The parking management server (25, 31) stores the received parking spot information in the parking spot information database, and/or updates the database with updated parking spot information received from the parking managers 19, in step 203. The updating of the database can take place in response to a driver scheduling a parking session directly with a parking manager 19, such as when a driver enters a parking garage or lot associated with the parking manager 19 or pays for parking at a parking meter or muni-meter associated with the parking manager 19. In such situations, the parking manager 19 sends updated availability information to the parking management server (25, 31) that indicates that a parking spot is currently occupied (and, optionally, information indicating that the parking spot will remain occupied for the period of time paid-for by the user). An update of parking spot information may not include location information of the parking spot, but may instead include a unique identifier for locating the parking spot's information in the database and information for updating the availability information for the parking spot. Each record of parking spot information in the database includes a unique identifier for the record of the parking spot, location and availability information for the parking spot, and an identifier for a parking manager 19 associated with the parking spot.

Once the parking spot information database is populated and updated, the parking management server (25, 31) can provide real-time parking guidance services. To this end, a user of the real-time parking guidance service may generate and send a parking information request message from a user device 13 (step 205). The user may use a parking guidance application, a vehicle navigation application, or other appropriate application running on the user device 13 to generate the parking information request message. The request can be transmitted from the user device 13 to the parking management server (25, 31) using packet-based data communications or using a messaging service (e.g., a short message service (SMS)). The information request includes a requested location and a requested time for a parking spot, as well as an identifier for the user and/or for the user device 13 submitting the request. The requested location may be a street address, GPS coordinates, a name or identifier for a landmark, or the like. The requested time may include a start time and, optionally, a time interval or period following the start time. The start time may be expressed as time of day (e.g., 11:05 am) or as a time relative to a current time (e.g., "now," or "in 15 minutes"). The time interval or period may be expressed as an amount of time (e.g., 2 hours) or as an end time (e.g., until 1:05 pm).

Upon receiving the parking information request, the parking management server (25, 31) identifies at least one parking spot in the database of parking spot information that has a location proximate to the requested location and has availability at the requested time (step 207). The proximity between a parking spot location and a requested location can be determined based on a straight-line distance between the two locations (i.e., a distance "as the bird flies" between the two locations), and/or based on a distance between the two locations along streets, sidewalks, walkways, and/or other pathways (i.e., a distance corresponding to an actual travel distance between the two locations). The at least one parking spot may include all parking spots within a particular proximity to the requested location (e.g., less than 0.1 miles), or a limited number of the closest parking spots to the requested location (e.g., the 10 closest parking spots, in order of proximity). In general, only parking spots that are available at the requested start time (and for the time interval or period included in the requested time) are identified.

In some examples, the parking management server (25, 31) identifies parking spot(s) in step 207 based on location, availability, as well as on additional factors. The additional factors can include one or more of user reviews or other rating information for parking spots, such that parking spot(s) having good reviews or high ratings are preferentially selected. The additional factors can include characteristics of parking spots, including parking spot size, height, ease of entry/exit into the spot, or the like, such that parking spot(s) suitable for parking small or large vehicles are preferentially selected (e.g., based on characteristics of a user's own vehicle) or such that parking spots requiring parallel parking can be excluded (e.g., based on a user's parking preferences). The additional factors can further include a user's parking history, which may be stored in the management server (25, 31) and used to identify parking spots, garages, or lots that the user has previously used are preferentially identified. The additional factors can further include promotions or coupons, such that parking spots, garages, or lots currently offering a promotion or for which the user has a coupon are preferentially identified. The additional factors can be used both to identify parking spot(s) in step 207, and/or to select an order in which to present identified parking spot(s) to the user.

Following identification of the at least one parking spot, the parking management server (25, 31) can optionally send a notification to parking manager(s) 19 associated with the identified parking spot(s) regarding forecasted parking load (step 209). For example, the parking management server (25, 31) can provide a notification to the parking manager(s) 19 that an information request was received for a parking spot in the vicinity of the requested location. In particular, the parking management server (25, 31) may determine whether multiple information requests for parking spots within a vicinity have been received during a limited time period (e.g., the last hour), and notify parking manager(s) 19 in the vicinity of the increased interest in parking spots at the location. The notification can be used to forecast future parking load, and to enable garage attendants or other parking administrators to adjust parking prices or restrict users that have not reserved parking through the parking guidance service from using the parking spots.

Following identification of the at least one parking spot, the parking management server (25, 31) sends a notification identifying the at least one parking spot to the user device from which the information request was received (step 211). The notification can include detailed information on the location of the identified parking spot(s), on the availability of the parking spot(s), and on price and payment options for the parking spot. In general, the notification will further include an option for the user to reserve and/or pre-pay for the parking spot.

In response to receiving the notification of matching parking spot(s), the user device 13 displays information for the identified at least one parking spot(s) to the user. The information may be overlaid on a map showing the requested location and the locations of each of the identified parking spot(s), or the information may be displayed in a list or grid format. In general, the information is processed and displayed by the parking guidance application, the vehicle navigation application, or other appropriate application running on the user device 13.

Upon reviewing the information for the identified at least one parking spot(s), the user may select an option to reserve one (or more) of the identified parking spot(s). In response to the selection, the user device 13 generates and transmits to the parking management server (25, 31) a parking reservation request identifying the parking spot selected by the user (step 213). In some examples, the parking reservation request includes payment information in the form of credit card information, and/or information for charging payment for the parking spot reservation to an account of the user.

The parking management server (25, 31) receives the parking reservation request, and confirms whether the parking spot selected by the user is still available at the requested time. Upon confirming that the parking spot selected by the user is available at the requested time, the parking management server (25, 31) processes the reservation request by updating the database of parking spot information to identify the selected parking spot as being unavailable at the requested time (step 215). Additionally, the parking management server (25, 31) transmits a notification of the completed reservation request to the parking manager 19 associated with the selected parking spot in the database (step 217). The notification of the completed reservation identifies the selected parking spot, the requested time, and identification information for identifying the user having made the reservation. The identification information can include information on the vehicle of the user (e.g., make, model, color, vehicle type, and/or license plate), and/or a unique confirmation identifier for use by the user during check-in, such as a confirmation number, a barcode, a QR code, an NFC code, or the like.

Finally, the parking management server (25, 31) transmits a confirmation of the completed reservation request to the user device 13 (step 219). The confirmation of the completed reservation provides confirmation to the user that the selected parking spot has successfully been reserved for the user. The confirmation can further include a unique confirmation identifier (e.g., a confirmation number, a barcode, a QR code, an NFC code, or the like) that the user can present to a garage or lot attendant, to an automated gate, or the like, in order to check-in to or gain access to the reserved parking spot. For example, upon arriving at the reserved parking spot, the user may present the unique confirmation identifier in step 223. If the presented identifier matches the unique confirmation identifier received by the parking manager 19 from the parking management server (25, 31), the user is authorized to park (step 225).

In one example, the unique confirmation identifier is a barcode or QR code that can be displayed on a screen of the user device 13. In the example, the parking manager 19 includes a barcode or QR code reader 21 operative to read the barcode or QR code displayed by the user device 13, and to determine whether the displayed code matches the code received in step 217 from the parking management server (25, 31). In another example, the unique confirmation identifier is an NFC code that can be loaded into and transmitted through an NFC antenna of the user device 13. In the example, the parking manager 19 includes an NFC reader 21 operative to read the NFC code from the user device 13, and to determine whether the code that is read matches the code received from the parking management server (25, 31). In other examples, the user punches the unique confirmation code into a keypad of the parking manager 19 or of an associated parking gate, or provides the unique confirmation code to a parking attendant, in order to be authorized to park. In examples including parking meters and muni-meters, the parking meters and muni-meters can include NFC/QR readers for checking users in.

The real-time parking guidance service can additionally be integrated with a vehicle guidance device or application of the user. In such a situation, once the user has selected a parking spot (e.g., in step 213), a vehicle guidance device or application of the user may automatically be provided with the location information of the selected parking spot. The vehicle guidance device or application then provides turn-by-turn directions to guide the user to the selected parking spot (step 221). In general, the location of the selected parking spot differs from the requested location, and the vehicle guidance device or application may thus override a previous request for directions to the requested location with a new request for directions to the selected or reserved parking spot.

In some examples, the user device 13 is provided with detailed information on the location of the selected/reserved parking spot, including information on the location of the parking spot within a parking lot. The user device 13 may then provide directions to guide the user to the parking lot and, upon entering the parking lot, to the particular spot within the parking lot. In instances in which a vehicle navigation application of the user device 13 is not operative to provide directions within a parking lot (e.g., in situations in which the vehicle navigation application does not have access to a map of the parking lot), the parking management server (25, 31) provides the user device 13 with data or instructions to guide the user to the parking spot within the parking lot. The detailed information on the location of the selected parking spot can be provided in the confirmation of the reservation request transmitted to the user device 13 from the parking management server (25, 31), and/or in the notification of matching parking spot(s) received by the user device 13. In some examples, a vehicle navigation application may additionally show available and/or unavailable parking spots on a display for consideration by the user. For example, as a user drives, the vehicle navigation application may show currently available parking spots (e.g., identified with a green flag) within the user's vicinity on a map or navigation display provided to the user. Parking spots forecasted to become available within a predetermined time interval may also be identified (e.g., with a purple flag), while unavailable spots that are not forecasted to become available may not be identified (or identified with a red flag).

The parking information request generated and transmitted by the user device 13 in step 205 includes a requested location and a requested time for a parking spot. In addition, in situations in which the requested time corresponds to a current time, the parking information request can additionally include a current location of the user device 13. If the current location information is included, the parking management server (25, 31) can additionally estimate a time required to travel from the current location of the user device 13 to the requested location, and use the estimated travel time (which may or may not include traffic conditions and take into account roadwork or closures among other conditions affecting travel time) to adjust the start time of the time period for which parking is requested. For example, the parking management server (25, 31) can identify parking spots that have availability at a future time determined based on the estimated travel time. For instance, upon determining that the user device 13 is a 25 minute drive away from the requested location, the parking management server (25, 31) can identify in step 207 at least one parking spot that is available 25 minutes from a current time, instead of identifying a parking spot that is available at the requested start time.

In addition, the parking management server (25, 31) may be configured to forecast the future availability of parking spots. The forecasting may be performed using historical information on the availability of a parking spot and/or of neighboring parking spots. In particular, the historical information can include the average parking time for a particular parking spot or for parking spots in an area for which forecasting is being performed, and/or the average parking time of a user currently occupying the parking spot. The historical information can further include statistics regarding the average number of cars entering or exiting a parking lot or parking garage, or parking lots or garages within the area for which forecasting is performed. The forecasting can further control for current and historical variables including weather and other environmental conditions, time of day, day of the week, and/or day of the year (e.g., on a federal holiday, or during the Christmas shopping season), event schedules (e.g., schedules of events at a neighboring stadium or other venue), or the like. The forecasting of future parking load can be used by the parking management server (25, 31) as part of identifying parking spot(s) that have availability in step 207. In particular, as part of step 207, the parking management server (25, 31) may identify parking spot(s) that have availability at the requested time and/or parking spot(s) that are forecasted to have availability at the requested time. In addition, the parking management server (25, 31) may exclude from consideration parking spot(s) that are forecasted not to have availability at the requested time.

Furthermore, the parking management server (25, 31) may preferentially identify parking spot(s) having availability (or that are forecasted to have availability) that are located close to other parking spot(s) having availability, such that if an identified parking spot becomes occupied, a user of the parking guidance system can readily be guided to another available parking spot nearby. As such, the parking management server (25, 31) may preferentially identify parking spot(s) located in a garage having multiple available spots, instead of identifying a parking spot in a similarly situated garage having only one available spot. Similarly, the parking management server (25, 31) may not identify parking spot(s) that do not have other parking spot(s) available nearby, or may provide such parking spot(s) with a lower priority order.

The information on available parking spots that is provided by the user device 13 can be updated in real-time. The real-time updating provides users with continuously updated information on available parking spots within the vicinity of a requested location. In one example, the user device 13 provides the updated information by periodically sending requests to the parking management server (25, 31) for updated parking information in the vicinity of the requested location (e.g., by periodically performing step 205), and by updating a display provided to the user and indicating available parking spots based on the updated information. In the one example, updates may be obtained every minute, for instance. The real-time updates can be used by a user driving in the vicinity of the requested location and looking for parking spots to open up in that vicinity. In another example, the parking management server (25, 31) automatically provides the updated information to the user device 13 in response to determining that a parking spot previously identified to the user as being available (e.g., a spot previously identified to the user in the notification of step 211) is no longer available at the requested time. In the other example, the parking management server (25, 31) continues to provide the real-time updates until it receives a parking reservation request from the user device 13.

In some examples, the parking information request generated and transmitted by the user device 13 in step 205 includes information on a seating location of a ticket-holder to an event. For example, the parking information request may include information on a seating section (e.g., section 204) in which the user will be seated in a stadium or other facility, or information on the user's preferred exit door from the stadium or other facility. In addition to manual entry, the seating location may be obtained through short-range interaction between the mobile device and ticket, such as by the mobile device scanning a QR code on the ticket. Alternatively or additionally, the seating location may be sent to the mobile device by a ticket provider (e.g., Ticketmaster, Stub Hub, or the like), for example in situations in which a user provides a mobile device number, email address, or other identification information at the time of purchase of a ticket. If the seating location information is included, the parking management server (25, 31) can identify parking spot(s) that have locations in the vicinity of the identified seating section, exit door, or the like, which may be different from that associated with the general entry point or overall venue itself. To this end, the parking management server (25, 31) may store a map of a venue including seating arrangements and sections numbers, locations of entry and exit gates, walkways through parking lots and/or to venue, or the like. In one example, the seating location information is used to identify a parking spot that is located close to the seating location, even if that parking spot is located further from an entrance to the facility than other available parking spots. Similarly, the seating location information can be used to identify parking spots that are located close to a particular exit door of the facility, close to an exit from a parking lot or garage, or the like, even if those parking spots are located further from an entrance to the facility or further from a street address for the facility than other available parking spots. For instance, the parking management server (25, 31) may identify the seating location within a map of the venue, identify the exit from the venue nearest the seating location, identify walkways emanating from the identified exit, and finally identify parking spots that are available and nearest to the seating location along the identified walkways.

Figure 3A:
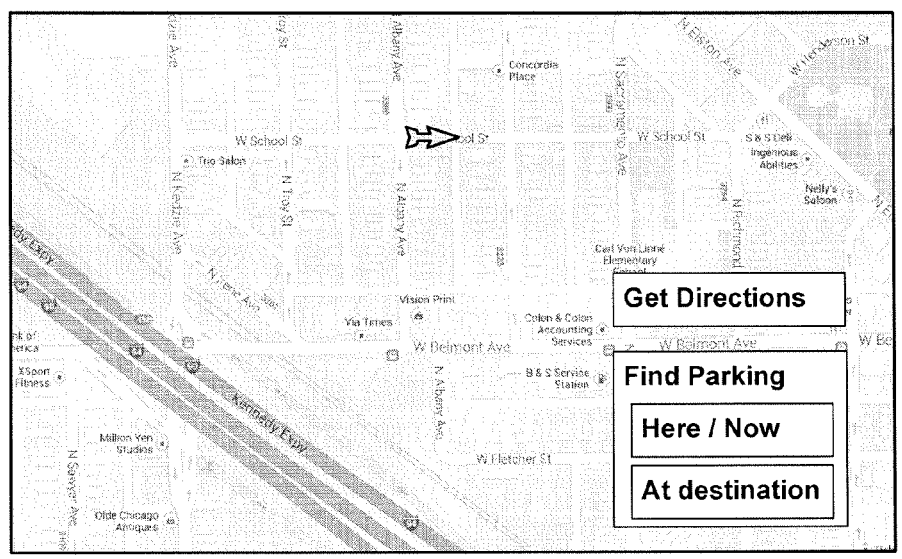
FIGS. 3A-3C are illustrative displays of a real-time parking guidance application running on a user device.
Figure 3B:
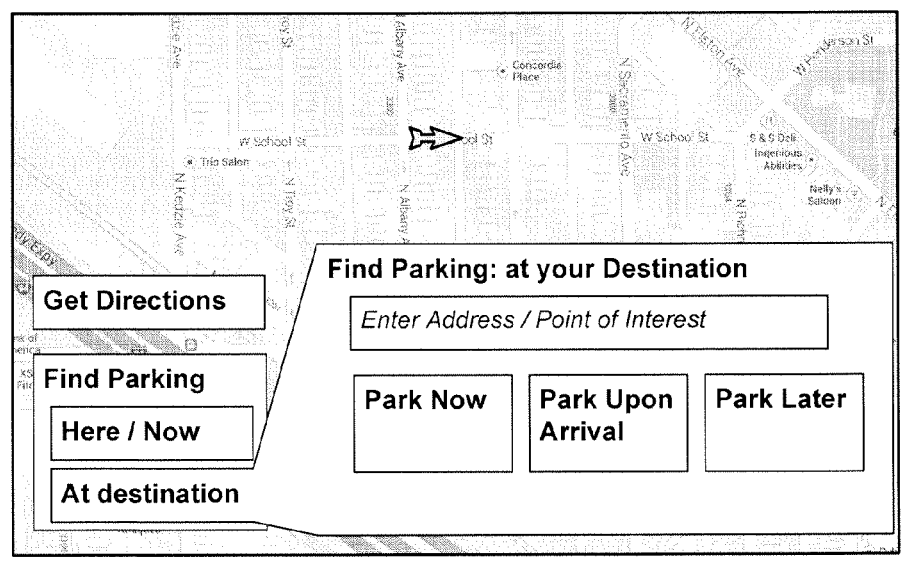
Figures 3C, 4:
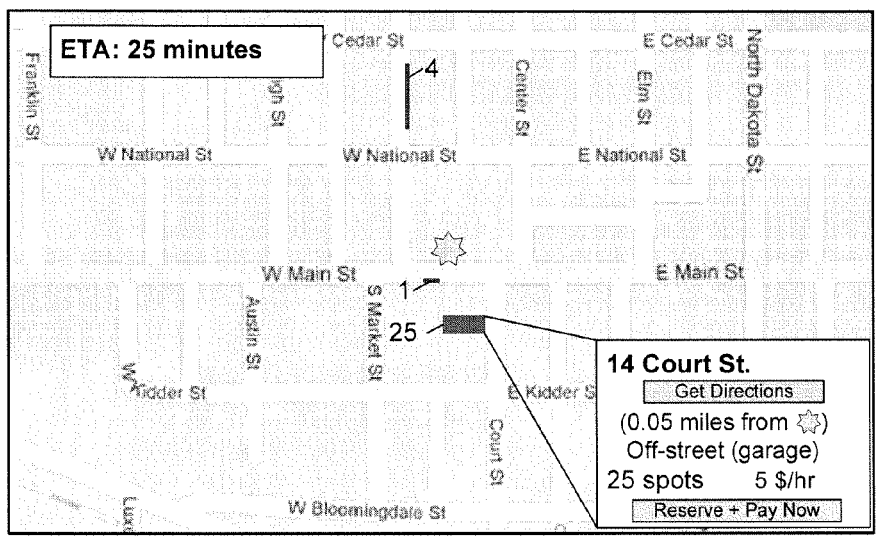
FIG. 4 shows an illustrative data structure used for storing parking spot information in a database of a parking management server providing a real-time parking guidance service.

FIGS. 3A-3C are illustrative display screens of a real-time parking guidance application running on a user device 13. The display screens 300, 330, and 360 each show display screens of different steps involved in a user obtaining parking guidance.

FIG. 3A shows a display screen 300 as may be presented to a user who has just turned on a user device 13 providing the parking guidance service. The display screen 300 shows a map including an arrow indicating the user's current location. The display screen 300 also includes various on-screen buttons corresponding to guidance functionalities available for use by the user. A "Get Directions" on-screen button can be activated to obtain vehicle guidance services to a particular destination. Alternatively, a "Find Parking" on-screen button provides access to the parking guidance service. As shown, the "Find Parking" button includes two options: a "Here/Now" option for finding currently available parking spots located near the user's current location; and a "At destination" option for finding parking spots at a location other than the user's current location and/or at a time other than a current time.

FIG. 3B shows a display screen 330 as may be presented to a user having selected the "At destination" on-screen menu option of display screen 300. In response to selecting the "At destination" option, the user is presented with a menu box including a field for entering an address or point of interest near which the user would like to find parking. The user may select the "Enter Address/Point of Interest" field in order to enter a requested location near which the user wishes to park. The requested location can be entered as an address or as a name of a point of interest using an on-screen keyboard, using voice recognition, or the like. The requested location may alternatively be retrieved by the user device 13 through short-range interaction, such as by the user device 13 scanning a QR code on a ticket, by the user device 13 retrieving the requested location from another device operative to communicate a destination address using NFC to the user device 13, or the like. Once the correct requested location is entered, the user selects a "Park Now" option in order to find parking spots near the requested location that are currently available, a "Park Upon Arrival" option to find parking spots near the requested location that will be available (or are forecasted to be available) at the user's estimated time of arrival at the address, or a "Park Later" option for finding parking spots at a later date or time to be entered by the user into the user device 13. In response to the user selecting one of the "Park Now," "Park Upon Arrival," and "Park Later" options, the user device 13 generates and transmits a parking information request to the parking management server (25, 31) (e.g., as shown in step 205 of FIG. 2).

FIG. 3C shows a display screen 360 as may be presented to a user having selected the "Park Upon Arrival" on-screen menu option of display screen 330. The display 360 shows a map that may be shown in response to the user device 13 receiving a notification of matching parking spots (e.g., following step 211 of method 200). As shown in display 360, real-time parking information is overlaid on a map showing the requested location (identified by a grey star) identified in the parking information request transmitted from the user device 13. Three different sets of parking spots are identified on the map in the vicinity of the requested location: one on-street parking spot is available across the street from the requested location; twenty-five off-street parking spots are available 0.05 miles from the requested location; and an additional four on-street spots are available further from the requested location.

As shown in the top-left corner of the display 360, the parking information displayed is based on the user's estimated time of arrival (ETA) at the requested location. Because the user is estimated to arrive at the requested location in 25 minutes, the parking information presented shows parking spots scheduled to be available at the ETA. In response to the user selecting one of the sets of parking spots on the display screen, additional information relating to the selected set is displayed. As shown in FIG. 3C, the user has selected the set of twenty-five off-street parking spots. As such, an address for the parking spots and pricing and distance information are provided to the user. Additionally, options for automatically getting directions to the parking spots and for reserving and paying for the parking spots are available for selection.

FIG. 4 shows an illustrative data structure 400 that may be used for storing parking spot information in the database of the parking management server (25, 31). In the example shown, the database includes a separate line entry for each parking spot that is registered for use through the real-time parking guidance service. Each line entry includes a parking spot identifier that is unique to the parking spot, location information for the parking spot (e.g., a street address), a parking manager identifier that identifies the parking manager 19 associated with the parking spot, and a field for storing availability information for the parking spot. The parking spot identifier, location information, and parking manager identifier are stored in the database in response to receiving, at the parking management server (25, 31), information relating to a new parking spot not previously identified in the database. The availability information for each parking spot is then continuously updated by the parking management server (25, 31) based on information received from the parking manager 19 associated with the parking spot and based on parking reservation requests received from user devices 13 for the corresponding parking spot.

Figure 5:
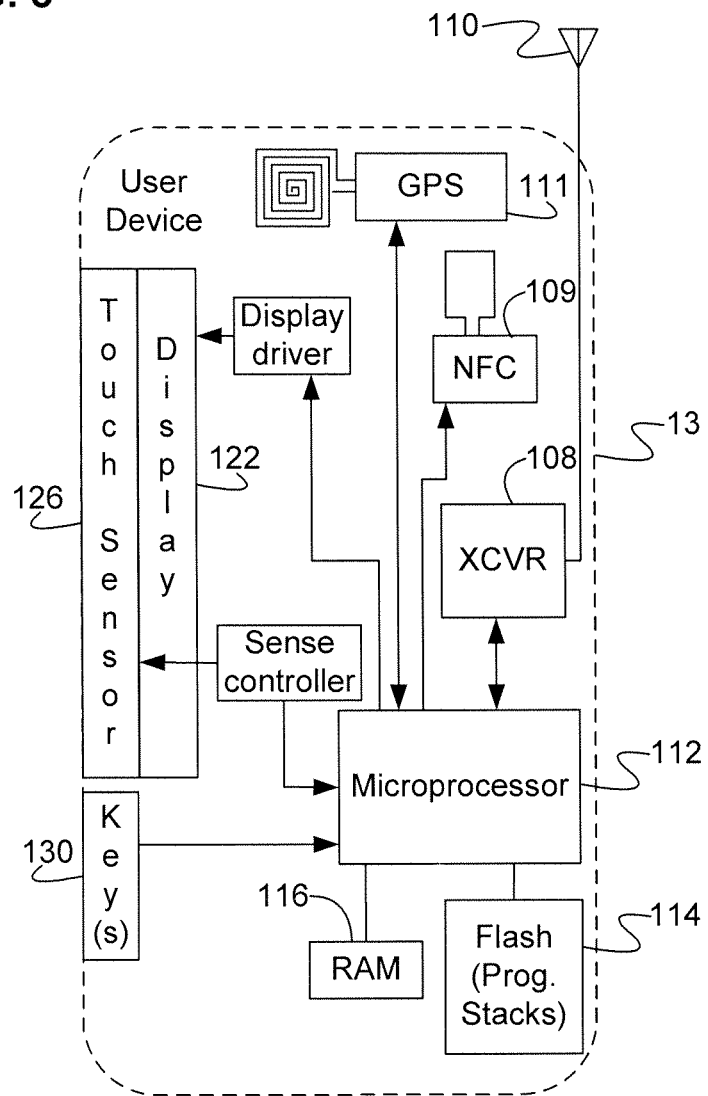
FIG. 5 is a high-level functional block diagram of a user device as may utilize the real-time parking guidance service through a system like that shown in FIG. 1.

FIG. 5 provides a block diagram illustration of an exemplary user device 13. Although the user device 13 may be a smart-phone, a tablet, or another type of device, the illustration shows the user 13 is in the form of a handset (although many components of the handset, such as a microphone and speaker, are not shown).

For digital wireless communications, the user device 13 includes at least one digital transceiver (XCVR) 108 connected to an antenna 110. The transceiver 108 provides two-way wireless communication of information, such as digital information, in accordance with the technology of the network 15. The transceiver 108 also sends and receives a variety of signaling messages in support of the various services provided via the user device 13 and the communication network. The user device 13 also includes an NFC interface 109 having an associated antenna and configured for communicating using near-field communication with other devices such as with an NFC reader 21 of a parking manager 19.

The user device 13 includes a display 122 for displaying messages, menus or the like, parking-guidance related information for the user, etc. A touch sensor 126 and keypad 130 enables the user to generate selection inputs, for example.

A microprocessor 112 serves as a programmable controller for the user device 13, in that it controls all operations of the user device 13 in accord with programming that it executes, for all normal operations, and for operations involved in the real-time parking guidance service. In the example, the user device 13 includes flash type program memory 114, for storage of various program routines and configuration settings. The user device 13 may also include a non-volatile random access memory (RAM) 116 for a working data processing memory. In a present implementation, the flash type program memory 114 stores any of a wide variety of applications, such as a vehicle navigation application software and parking guidance application software. The memories 114, 116 also store various data, such as input by the user or received from the parking management server (25,31). Programming stored in the flash type program memory 114 is loaded into and executed by the microprocessor 112 to configure the processor 112 to perform various desired functions, including functions involved in providing real-time parking guidance.

In some examples, the user device 13 further includes a GPS interface 111 coupled to a GPS antenna designed to receive GPS location signals transmitted by satellites. The GPS interface 111 is communicatively coupled to the microprocessor 112, and is operative to provide location information to the microprocessor based on the received location signals.

Figures 6, 7:
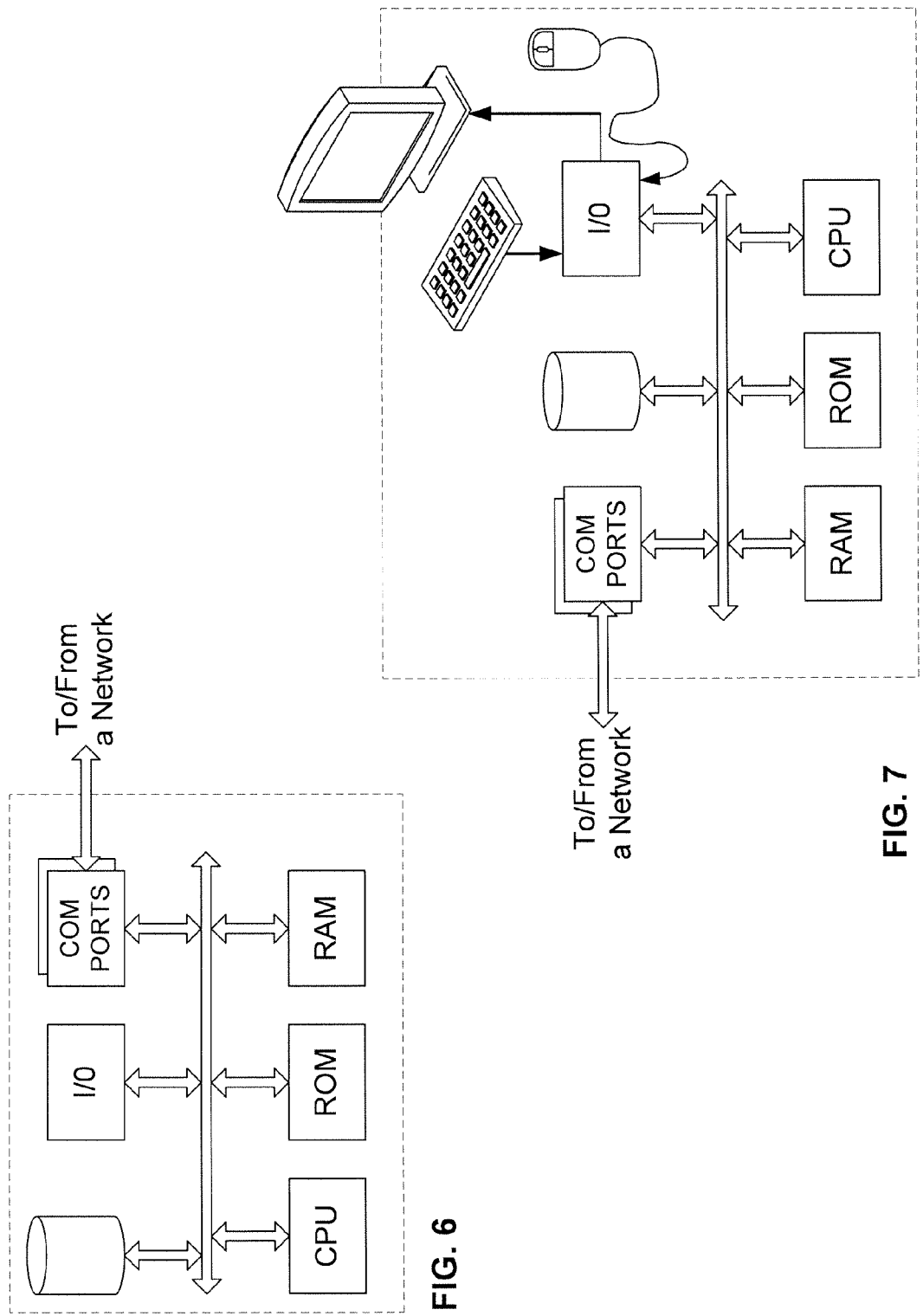
FIG. 6 is a simplified functional block diagram of a computer that may be configured as a host or server, for example, to function as the parking management server in the system of FIG. 1.
FIG. 7 is a simplified functional block diagram of a computer, work station, or terminal device that may function as a parking manager in the system of FIG. 1.

In addition to relying on user devices 13, the real-time parking guidance service uses a parking management server (25, 31) and parking managers 19 for operation. Although special purpose devices may be used to implement the management server (25, 31) and the parking managers 19, the server and managers may be implemented using a general class of data processing device. FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a parking manager or other type of terminal device.

A server or other general purpose computer platform includes a data communication interface for packet data communication. The server or other general purpose computer platform also includes a central processing unit (CPU), in the form of one or more processors, for executing program instructions. The server and platform typically include an internal communication bus, program storage and data storage for various data files to be processed and/or communicated by the server, although the server and platform often receive programming and data via network communications. The server and platform functions may be implemented in a distributed fashion on a number of similar platforms, to distribute the processing load.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:
1. A method comprising:
 receiving, by a parking management server and from a real-time parking guidance application running on a user device, a parking information request,
  the parking information request including information identifying a requested location and a requested time;

providing, by the parking management server and based on receiving the parking information request, particular information to an authentication server for the authentication server to authenticate whether the user device is authorized to access a real-time parking guidance service that is available via the real-time parking guidance application,
  the authentication server being operated by a carrier that provides mobile communication services to the user device via a mobile communications network,
  the parking management server being operated by an entity that is separate from the carrier, and
  the entity and the carrier being in an arrangement for the authentication server to provide an authentication function that authenticates whether the user device is authorized to access the real-time parking guidance service that is available via the real-time parking guidance application;

receiving, by the parking management server and from the authentication server, an indication that the authentication server used the authentication function to successfully authenticate that the user device is authorized to access the real-time parking guidance service that is available via the real-time parking guidance application;

providing, by the parking management server and based on receiving the indication that the authentication server used the authentication function to successfully authenticate that the user device is authorized to access the real-time parking guidance service that is available via the real-time parking guidance application, the user device access to the real-time parking guidance service via one or more communication elements of the mobile communications network;

identifying, by the parking management server, after providing the user device access to the real-time parking guidance service via the one or more communication elements of the mobile communications network, and in a database of parking spot information, a parking spot, having a location proximate to the requested location and having availability at the requested time, based on the parking spot being within an area with one or more other available parking spots;

determining, by the parking management server, that the parking spot is no longer available at the requested time;

continuously transmitting, by the parking management server, until a reservation request is received, and based on determining that the parking spot is no longer available at the requested time, real-time information regarding the one or more other available parking spots to the user device;

receiving, by the parking management server and from the real-time parking guidance application running on the user device, the reservation request,
  the reservation request identifying another parking spot, of the one or more other available parking spots, for reservation; and updating, by the parking management server and based on receiving the reservation request, the database of parking spot information to identify the other parking spot as being unavailable at the requested time.

2. The method of claim 1, further comprising:
transmitting a confirmation of the reservation request to the user device,
  wherein the confirmation includes at least one of a barcode, a quick response (QR) code, or a near-field communication (NFC) code for authentication of the user device to a parking manager.

3. The method of claim 1, further comprising:
transmitting a confirmation of the reservation request to the user device.

4. The method of claim 3, wherein the confirmation includes information that causes the user device to provide driving directions that guide, through a parking lot, to the other parking spot.

5. The method of claim 1,
wherein the parking information request includes information identifying a seating location of a ticket-holder to an event, and
wherein identifying the parking spot includes:
  identifying the parking spot further based on the seating location of the ticket-holder to the event.

6. The method of claim 1, further comprising:
receiving, from a plurality of parking managers, parking spot information of a plurality of parking spots,
  wherein the plurality of parking spots include the parking spot and the one or more other available parking spots; and
storing the parking spot information in the database of parking spot information.

7. The method of claim 6, wherein the parking spot is a homeowner's driveway.

8. The method of claim 1, further comprising:
transmitting a notification, to a parking manager associated with the other parking spot, including information regarding forecasted parking load determined based at least in part on the parking information request.

9. A system comprising:
a parking management server operatively coupled to a communication network for communication with a user device,
  the parking management server being configured to:
    receive, from a real-time parking guidance application running on the user device, a parking information request,
      the parking information request including information identifying a requested location and a requested time;
    provide, based on receiving the parking information request, particular information to an authentication server for the authentication server to authenticate whether the user device is authorized to access a real-time parking guidance service that is available via the real-time parking guidance application,
      the authentication server being operated by a carrier that provides mobile communication services to the user device via the communications network,
      the parking management server being operated by an entity that is separate from the carrier, and
      the entity and the carrier being in an arrangement for the authentication server to provide an authentication function that authenticates whether the user device is authorized to access the real-time parking guidance service that is available via the real-time parking guidance application;
    receive, from the authentication server, an indication that the authentication server used the authentication function to successfully authenticate that the user device is authorized to access the real-time parking guidance service that is available via the real-time parking guidance application;

provide, based on receiving the indication that the authentication server used the authentication function to successfully authenticate that the user device is authorized to access the real-time parking guidance service that is available via the real-time parking guidance application, the user device access to the real-time parking guidance service via one or more communication elements of the communications network;

identify, after providing the user device access to the real-time parking guidance service via the one or more communication elements of the communication network and in a database of parking spot information, a parking spot having a location proximate to the requested location and having availability at the requested time, based on the parking spot being within an area with one or more other available parking spots;

determine that the parking spot is no longer available at the requested time;

continuously transmit, until a reservation request is received and based on determining that the parking spot is no longer available at the requested time, real-time information regarding the one or more other available parking spots to the user device from which the parking information request was received;

receive, from the real-time parking guidance application running on the user device, the reservation request, the reservation request identifying another parking spot, of the one or more other available parking spots, for reservation; and update, based on receiving the reservation request, the database of parking spot information to identify the other parking spot as being unavailable at the requested time.

10. The system of claim 9,
wherein the parking management server is further configured to:
transmit a confirmation of the reservation request to the user device, and
wherein the confirmation includes at least one of a barcode, a QR code, or an NFC code for authentication of the user device to a parking manager.

11. The system of claim 9, wherein the parking management server is further configured to:
transmit a confirmation of the reservation request to the user device so as to cause the user device to provide driving directions to the other parking spot.

12. The system of claim 9,
wherein the parking information request includes information identifying a seating location of a ticket-holder to an event, and
wherein, when identifying the parking spot, the parking management server is configured to:
identify the parking spot further based on the seating location of the ticket-holder to the event.

13. The system of claim 9, wherein the parking management server is further configured to:
receive, from a plurality of parking managers, parking spot information of a plurality of parking spots,
wherein the plurality of parking spots include the parking spot and the one or more other available parking spots; and store the parking spot information in the database of parking spot information.

14. The system of claim 13, wherein the parking spot corresponds to a homeowner's driveway.

15. The system of claim 9, wherein the parking management server is further configured to:
transmit a notification, to a parking manager associated with the other parking spot, including information on forecasted parking load.

16. The system of claim 9, wherein the other parking spot is located at a curb-side.

17. A non-transitory computer-readable medium storing instructions, the instructions comprising:
one or more instructions that, when executed by a parking management server, cause the parking management server to:
receive, from a real-time parking guidance application running on a user device, a parking information request;

provide, based on receiving the parking information request, particular information to an authentication server for the authentication server to authenticate whether the user device is authorized to access a real-time parking guidance service that is available via the real-time parking guidance application, the authentication server being operated by a carrier that provides mobile communication services to the user device via a communications network, the parking management server being operated by an entity that is separate from the carrier, and the entity and the carrier being in an arrangement for the authentication server to provide an authentication function that authenticates whether the user device is authorized to access the real-time parking guidance service that is available via the real-time parking guidance application;

receive, from the authentication server, an indication that the authentication server used the authentication function to successfully authenticate that the user device is authorized to access the real-time parking guidance service that is available via the real-time parking guidance application;

provide, based on receiving the indication that the authentication server used the authentication function to successfully authenticate that the user device is authorized to access the real-time parking guidance service that is available via the real-time parking guidance application, the user device access to the real-time parking guidance service via one or more communication elements of the communications network;

identify, after providing the user device access to the real-time parking guidance service via the one or more communication elements of the communication network and in a database of parking spot information, a parking spot based on the parking spot being within an area with one or more other available parking spots;

determine that the parking spot is no longer available;

continuously transmit, until a reservation request is received and based on determining that the parking spot is no longer available, real-time information regarding the one or more other available parking spots to the user device from which the parking information request was received;

receive, from the real-time parking guidance application running on the user device, the reservation request, the reservation request identifying another parking spot, of the one or more other available parking spots, for reservation; and update, based on receiving the reservation request, the database of parking spot information to identify the other parking spot as being unavailable.

18. The non-transitory computer-readable medium of claim 17, where the parking spot is associated with a parking manager, where the instructions further comprise:

one or more instructions that, when executed by the parking management server, cause the parking management server to:

receive updated availability information from the parking manager, and where the parking spot is determined to be no longer available based on the updated availability information.

19. The non-transitory computer-readable medium of claim 17, where the parking spot is associated with a first parking manager, where the other parking spot is associated with a second parking manager, where the instructions further comprise:

one or more instructions that, when executed by the parking management server, cause the parking management server to:

determine that multiple information requests for parking spots within a vicinity of the area during a particular time period, and provide, to the first parking manager and the second parking manager, a notification regarding an increased interests in parking in the area.

20. The non-transitory computer-readable medium of claim 17, where the instructions further comprise:

one or more instructions that, when executed by the parking management server, cause the parking management server to:

determine a forecast of future availability based on historical information regarding the parking spot and the one or more other available parking spots, and where the parking spot is identified further based on the forecast of future availability.

\* \* \* \* \*